United States Patent [19]

Suzuki et al.

[11] Patent Number: 4,576,896

[45] Date of Patent: Mar. 18, 1986

[54] OPTICAL RECORDING MEDIUM

[75] Inventors: Setsuo Suzuki; Morio Tsuge; Syoichi Nakayama, all of Yokohama, Japan

[73] Assignee: Sumitomo Bakelite Company Limited, Tokyo, Japan

[21] Appl. No.: 663,946

[22] Filed: Oct. 23, 1984

[30] Foreign Application Priority Data

Dec. 6, 1983 [JP] Japan .................................. 58-229196

[51] Int. Cl.$^4$ ............................................... G11B 3/70
[52] U.S. Cl. ................................... 430/271; 430/945; 346/135.1; 346/137; 428/64; 428/413; 428/414; 369/284; 369/286; 369/288
[58] Field of Search .................... 428/64, 65, 413, 414; 369/284, 288, 286; 430/271, 945; 346/135.1, 137

[56] References Cited

FOREIGN PATENT DOCUMENTS 59-22248  2/1984  Japan .

*Primary Examiner*—Alexander S. Thomas
*Attorney, Agent, or Firm*—Sheridan Neimark; Karl W. Flocks

[57] ABSTRACT

An optical recording medium comprising a transparent substrate of a synthetic resin and an information recording layer provided thereon, on which medium information can be optically written, read and erased by means of a laser light, wherein said transparent substrate consists essentially of a cast-cured product of an epoxy resin composition comprising an alicyclic epoxy resin, or a mixture of a major amount of an alicyclic epoxy resin and a minor amount of an aromatic epoxy resin, an organic polybasic acid anhydride, a curing-accelerator and an anti-discoloring agent.

14 Claims, No Drawings

OPTICAL RECORDING MEDIUM

BACKGROUND OF THE INVENTION

This invention relates to an optical recording medium (optical disk recording medium) on which information can be written, read and erased by use of a laser light and which comprises a transparent substrate consisting of a cast-cured product of an epoxy resin composition and an information-recording layer provided thereon, and to a process for producing the optical recording medium.

DESCRIPTION OF THE PRIOR ART

Recently, attention has been directed to an optical information-recording medium from the standpoint of a high density record, and extensive research thereon has been made. As a result, some media are now commercially available.

These available optical recording media are of the READ-ONLY type, DRAW type, ERASABLE type and the like.

Heretofore, the so-called DRAW type optical recording media have been generally those in which a low-boiling metal such as tellurium, selenium, bismuth, or the like or a complex of the metal with an organic material is vapor-deposited as a recording layer on a transparent substrate having a guide groove thereon, and when a modulated laser light is applied to this layer, this layer is melted at the irradiated spot, after which the molten material shrinks owing to the influence of surface tension, whereby a pore having an edge is formed in the recording layer.

Moreover, the ERASABLE type optical recording media are those in which a film of a rare earth metal and transition metal series magnetic alloy such as Tb-Gd-Fe or the like is formed by a spattering method or the like as a recording layer on the substrate. When a laser light is applied to this layer while applying a weak magnetic field thereto from the exterior, magnetization is reversed, whereby information is recorded.

The substrate which has heretofore been used in such an optical recording medium is a glass plate or a transparent synthetic resin plate, and there has been used a material which is optically isotropic in order to satisfy the requirement that the substrate is free from double refraction (birefringence). The transparent synthetic resin plate has been a molded article of polymethyl methacrylate (PMMA), a polysulfone (PS), polycarbonate (PC), polyvinyl chloride (PVC), a copolymer of vinyl chloride and vinyl acetate or the like.

At present, a PMMA substrate formed by injection molding is in most cases used in view of moldability and optical transparency.

However, in the case of PMMA substrate, the enhancement of recording density is required, and the following disadvantages have become a serious problem because the high reliability of medium has become required:

(a) The substrate is inferior in thermal resistance, so that when the temperature of the surface of the substrate rises when vapor-depositing various functional films thereon, the guide groove becomes flat and comes not to work.

(b) Since the resin is thermoplastic, there are some cases where creep appears owing to the centrifugal force caused by high speed revolution at the time of access. Moreover, when it is exposed to high temperature during storage deformation is caused, whereby it follows that the substrate pitches and rolls when rotated.

(c) Since the moisture absorption is large, such problems are caused that deformation due to moisture absorption occurs and oxidation of functional film is accelerated.

(d) Since the article is formed by injection molding, the article has a molding stress and double refraction appears.

(e) Adjustment of index of refraction is difficult and the index of refraction is limited to that of the resin per se.

On the other hand, PC is richer in thermal resistance than PMMA, but the double refraction is as great as 80 nm (double path) or more due to the stress during molding. Therefore, PC cannot be formed into a substrate for high quality optical recording medium of the DRAW AND ERASABLE type.

SUMMARY OF THE INVENTION

The object of this invention is to provide an optical recording medium of the DRAW type and the ERASABLE type having better properties and performances.

The present inventors have examined the characteristics of various resins as substrates to solve the above problems simultaneously, and as a result, have found that substrates obtained by cast-curing a thermosetting resin, which has been considered to be impossible to cast, particularly an alicyclic epoxy resin or a mixture of an aromatic epoxy resin and an alicyclic epoxy resin are excellent.

According to this invention, there is provided an optical recording medium on which information can be optically written, read and erazed by use of a laser light, and which comprises a transparent substrate of a synthetic resin and an information-recording layer attached to the surface of the substrate, characterized in that the transparent substrate is composed of a cast-cured product of an epoxy resin composition comprising an alicyclic epoxy resin or a mixture of an alicyclic epoxy resin and an aromatic epoxy resin, an organic polybasic acid anhydride, a curing accelerator and an anti-discoloring (anti-oxidative) agent. When the cast-cured product of the above epoxy resin composition is applied to the substrate for optical recording medium, quite unexpected performance is obtained.

DETAILED DESCRIPTION OF THE INVENTION

The alicyclic epoxy resin or aromatic epoxy resin used in this invention is normally liquid, and includes, for example, alicyclic epoxy resins such as dipentene dioxide, vinylcyclohexene dioxide, 3,4-epoxy6-methylcyclohexylmethyl 3,4-epoxy-6-methylcyclohexanecarboxylate, 3,4-epoxycyclohexylmethyl 3,4-epoxycyclohexanecarboxylate, and the like; and aromatic epoxy resins such as liquid bisphenol A type resins, liquid novolac type epoxy resins and the like, In particular, alicyclic epoxy resins are preferably used because they are low in viscosity and hence excellent in castability, and in addition, cured products having a high glass transition temperature (Tg) are obtained.

Moreover, the use of a mixture of these epoxy resins is very effective in this invention, and a mixture of a major amount of an alicyclic epoxy resin and a minor amount of an aromatic epoxy resin, specifically a liquid bisphenol A type resin, is important because the index of refraction of the cured product can be varied appropriately in the range of from 1.50 to 1.60 depending upon the proportion of the resins mixed.

The proportion of the resins mixed is also important, and it has been found that the relation between the mixing ratio and the index of refraction is linear. Therefore, a transparent substrate having any desired index of refraction can be obtained by selecting a proper mixing ratio.

For the substrate for optical recording media, the mixing ratio of the aromatic epoxy resin to the alicyclic epoxy resin is preferably 9:1–0:10, and if the proportion of the aromatic epoxy resin is larger than this range the index of refraction becomes large.

When the alicyclic epoxy resin is used alone or in a major amount, there is a tendency of the index of refraction becoming small and there is an advantage of indicating a light transmission of 91% or more at 830 nm.

If a flame-retardance is required, a brominated epoxy resin may be applied, but in this case, the index of refraction becomes large.

The organic polybasic acid anhydrides used as the curing agent in this invention are required to have a high consistency with the liquid epoxy resin, and preferred are aliphatic or alicyclic polybasic acid anhydrides having no aromatic ring in the molecule, such as hexahydrophthalic anhydride, tetrahydrophthalic anhydride, methyltetrahydrophthalic anhydride, endomethylenetetrahydrophthalic anhydride, polyazelaic anhydride and the like in view of low index of refraction and high Tg. Unsaturated aliphatic or aromatic polybasic acid anhydrides such as maleic anhydride, phthalic anhydride, trimellitic anhydride, pyromellitic anhydride and the like may also be used in admixture with the above anhydride in an appropriate proportion.

As the curing acclerator used in this invention, there are preferred imidazoles such as 2-ethyl-4-methylimidazole, 2-methylimidazole, 1-benzyl-2-methylimidazole and the like; tertiary amines such as 1,8-diazabicycloundecane and the like; 1,8-diazabicyclo[5,4,0]undecene-7 2-ethylhexylcarboxylic acid salt; etc.

As the anti-discoloring agent, there may be used hindered phenols such as 2,6-di-tertiary butyl-p-cresol, 2-allyl-6-propyl-p-cresol, and the like; organic sulfides; organic phosphites; higher fatty acid salts; and the like alone or in combination.

In order to keep the stability against discoloration at high temperatures, the use of them in combination is remarkably effective in some cases.

The cast-cured products of these compositions are used as transparent substrates, and a recording layer is formed on the above substrate by vapor deposition of a low melting point metal such as Te, Se, Bi and the like or a complex of the metal with an organic material.

The optical recording medium of this invention has unexpectedly superior thermal resistance, low index of refraction and high Tg, and since the substrate is obtained by casting, the optical recording medium is optically free from molding stress and has an excellent quality.

A further excellent optical recording medium can be obtained by modifying the surface of the above transparent substrate for the optical recording medium of this invention. That is, the surface hardness of the transparent substrate consisting of the cast-cured product of the epoxy resin composition comprising an alicyclic epoxy resin or a mixture of an aromatic epoxy resin and an alicyclic epoxy resin is substantially the same as that of PMMA, and hence, the surface tends to have a flaw, and therefore, if at least the side of the substrate which is exposed to a laser irradiation is subjected to a surface-hardening treatment, an optical recording medium excellent in handling is obtained.

The substrate which has been subjected to the surface-hardening treatment on one or both sides can be prevented from encountering a trouble such as flawing even in the step of forming a functional film, and enables intimate adhesion to a low melting point metal such as Te, Se, Bi or the like to be used as an information-recording layer.

The surface-hardening treatment can be carried out as follows:

(a) A $SiO_2$ or SiO film is formed by a spattering method on the transparent substrate formed by cast-curing an epoxy resin composition comprising an alicyclic epoxy resin or a mixture of an aromatic epoxy resin and an alicyclic epoxy resin.

(b) A film of a radiation-curable resin or a thermosetting resin having a pencil hardness of 4H or more is formed by a spiner method, a dipping method or a roll-coater method on the transparent substrate formed by castcuring an epoxy resin composition comprising an alicyclic epoxy resin or a mixture of an aromatic epoxy resin and an alicyclic epoxy resin.

(c) A film of a radiation-curable resin or a thermosetting resin is formed on the transparent substrate formed by cast-curing an epoxy resin composition comprising an alicyclic epoxy resin or a mixture of an aromatic epoxy resin and an alicyclic epoxy resin as in above (b), and then, a $SiO_2$ or SiO film is formed on the film of the resin.

The transparent substrate for optical recording medium treated by the above method is excellent in resistance to abrasion or scratching and also excellent in intimate adhesion to a metal film which is an information-recording layer.

In this invention, any radiation-curable resin may be used as far as its cured coating film has a pencil hardness of 4H or more, and an ultraviolet ray-curable resin system consisting of a solution of an oligomer such as epoxy acrylate, urethane acrylate, polyester acrylate, polyether acrylate or the like in a polyfunctional acrylate monomer is preferably used. These ultraviolet ray-curable resins may be used in admixture of two or more, and the resulting mixtures have an effect of forming a coating free from unevenness in some cases.

Thermosetting resins which can form a highly hard resin coating such as silicone resin, melamine resin, polyimide resin and the like may also be used appropriately.

Moreover, a method may be appropriately used which comprises diluting the above resin with a solvent, applying the resulting solution to the transparent substrate and curing the coating film in order to form a cured thin coating film on the transparent substrate.

It is preferable to use a photoinitiator having a good sensitivity in a relatively long wavelength region such as 4'-isopropyl-2-hydroxy-2-methylpropyophenone, 2,2-dimethoxy-2-phenylacetophenone, benzoin isobutyl ether, 1-hydroxyhexyl phenyl ketone or the like alone or in combination of two or more.

For the purpose of imparting a toughness, a polythiol compound may be added to the resin for the cured coating film in a proportion of 2 to 10 parts by weight, preferably about 5 parts by weight, per 100 parts by weight of the resin. When the proportion exceeds 10 parts by weight, the thermal resistance, hardness, glass transition temperature and the like are adversely affected. Moreover, a stabilizer, an anti-discoloring agent and the like may be added, if necessary, to the resin for the cured coating film.

The radiation-curable resin or thermosetting resin for the surface-cured coating is applied to the substrate by a conventional method such as spinner method, dipping method, roll-coater method or the like, and then subjected, as it is, or after removal of solvent, to irradiation with a radiation or heating to cure the coating film.

The thickness of the cured coating layer is preferably 5 to 15μ, and if the thickness is less than 5μ there is a possibility of insufficient curing due to the oxygen-prohibiting effect. If the thickness is more than 15μ there is a fear of double refraction of a laser from an optical point of view.

The index of refraction of said cured coating layer is preferably as close as possible to that of the epoxy resin composition comprising the alicyclic epoxy resin or a mixture of the aromatic epoxy resin and the alicyclic epoxy resin.

By applying the surface-hardening treatment to at least one side of the transparent substrate, an optical recording medium having a surface hardness of 4H or more in terms of pencil hardness can be obtained.

In the case where the surface-hardening treatment is conducted with $SiO_2$, SiO or the like, the treatment is usually by a spattering method. The thickness of the resulting oxide layer is preferably in the range of from 100 Å to 5,000 Å. By forming the $SiO_2$ or SiO film, advantages can be obtained in respect of not only thermal resistance and resistance to abrasion or scratching but also resistance to steam-permeation, and the thickness of the $SiO_2$ SiO film should not be too great because the oxide layer is cracked though a thicker $SiO_2$ or SiO film is preferred.

The steam-permeability of this film is 0.01 g/cm$^2$ or less, and therefore, the deterioration of the information-recording layer due to steam can be prevented.

An information-recording layer is formed on the transparent substrate consisting of a cast-cured product of an epoxy resin composition comprising the alicyclic epoxy resin or a mixture of the aromatic epoxy resin or the alicyclic epoxy resin directly or after applying the surface treatment to the substrate, by applying a low melting point metal such as Te, Se, Bi or the like or a complex of the metal with an organic material by a conventional manner such as a spattering method or a vapor-deposition method. As a result thereof, a recording medium having excellent optical properties which have never been found is obtained.

DESCRIPTION OF THE PREFERRED EMBODIMENTS

Example 1

An epoxy resin composition consisting of an epoxy resin, an organic polybasic acid anhydride, a curing accelerator and an anti-discoloring agent was prepared with the following recipe:

| Recipe | Part by weight |
| --- | --- |
| Alicyclic epoxy resin [3,4-epoxycyclohexylmethyl 3,4-epoxycyclohexanecarboxylate] | 100 |
| Methylhexahydrophthalic anhydride | 125 |
| 1,8-Diazabicyclo[5,4,0]undecene-7 2-ethylhexylcarboxylic acid salt | 4.0 |
| 2,6-Di-tertiary butyl-p-cresol | 1.0 |

The resulting epoxy resin composition was poured into a casting mold having a diameter of 305 mm and a thickness of 1.2 mm and composed of a glass plate and a nickel stamper reinforced with a backing and having a guide groove on one side and a releasing film of $MgF_2$ on the same side, and heat-cured at 120° C. for 2 hours.

The molded article was then taken out of the mold to obtain a cast-cured transparent substrate of the epoxy resin composition having a guide groove.

A metallic tellurium-carbon system film was formed by vapor deposition on the substrate surface having a guide groove in a conventional manner to obtain an optical recording medium having a functional film.

Since the molding was according to a casting method, the double refraction due to molding stress was small, the index of refraction of the substrate was 1.535, and the retardation in the substrate having a diameter of 305 mm was 0.1 to 7 nm (double path).

On the above substrate was formed a metallic tellurium-carbon system film having a thickness of 300 Å while introducing a carbon disulfide gas in the vacuum vessel of a vacuum-deposition apparatus and generating a plasma, to obtain an optical recording medium.

The characteristics of the optical recording medium are shown in Table 1.

Example 2

An epoxy resin composition consisting of an epoxy resin, an organic polybasic acid anhydride, a curing accelerator and an anti-dicoloring agent with the following recipe was prepared:

| Recipe | Parts by weight |
| --- | --- |
| Alicyclic epoxy resin [3,4-epoxy-6-methylcyclohexylmethyl 3,4-epoxy-6-methylcycloexyl-carboxylate] | 100 |
| Methylhexahydrophthalic anhydride | 103 |
| 1,8-Diazabicyclo[5,4,0]undecene-7 2-ethylhexylcarboxylic acid salt | 4.0 |
| 2,6-Di-tertiary butyl-p-cresol | 1.0 |

The resulting resin composition was poured into a casting mold having a diameter of 305 mm and a thickness of 1.2 mm composed of a glass plate and a nickel stamper reinforced with a backing and having a guide groove on one side and a releasing film of $MgF_2$ on the same side, and heat-cured at 120° C. for 2 hours.

The molded article was then taken out of the mold to obtain a cast-cured transparent substrate of the epoxy resin composition having a guide groove.

A metallic tellurium-carbon system film was formed by vapor deposition on the substrate surface having the guide groove in the same manner as in Example 1 to obtain an optical recording medium having a functional film.

Since the molding was according to a casting method, the double refraction due to molding stress was small, the retardation in the substrate having a diameter of 305 mm was 0.1 to 5 nm (double path).

The characteristics of the optical recording medium are shown in Table 1.

Example 3

An epoxy resin composition consisting of an epoxy resin, an organic polybasic acid anhydride, a curing accelerator and an anti-discoloring agent was prepared with the following recipe:

|  | Parts by weight |
|---|---|
| Recipe A |  |
| Bisphenol A type epoxy resin | 100 |
| Methylhexahydrophthalic anhydride | 88 |
| 2-Ethyl-4-methylimidazole | 0.5 |
| 2,6-Di-tertiary butyl-p-cresol | 1.0 |
| Recipe B |  |
| Alicyclic epoxy resin [3,4-epoxy-cyclohexylmethyl 3,4-epoxy-cyclohexanecarboxylate] | 100 |
| Methylhexahydrophthalic anhydride | 122 |
| 2-Ethyl-4-methylimidazole | 2.0 |
| 2,6-Di-tertiary butyl-p-cresol | 1.0 |

The above compositions having the recipes A and B were mixed at a A to B weight ratio of 1:1 to obtain an epoxy resin composition.

In the same manner as in Examples 1 and 2, a transparent substrate was obtained from the epoxy resin composition by casting. The light transmission of the substrate at 830 nm was 92% and the index of refractance thereof was 1.510.

In the same manner as in Example 1, an information-recording layer was formed on the substrate in the same manner as in Example 1, to obtain an optical recording medium.

The characteristics of the optical recording medium thus obtained are shown in Table 1.

Comparative Example 1

Using PMMA (DELPET #560F manufactured by Asahi Kasei Kogyo Kabushiki Kaisha), a transparent substrate consisting of an injection-molded article having a diameter of 305 mm and a thickness of 1.2 mm and having also a guide groove on one side was obtained by an injection molding machine at a cylinder temperature of 260° C., a mold temperature of 60° C., at an injection pressure of 100 kg/cm$^2$ for an injection period of 1.0 sec.

In the same manner as in Example 1, a metallic tellurium-carbon system film was formed on the substrate to obtain an optical recording medium.

The characteristics of the optical recording medium are shown in Table 1.

Comparative Example 2

Using PC (IUPLLON H-3000, manufactured by Mitsubishi Gas Chemical Co., Ltd.), a transparent substrate consisting of an injection molded article having a diameter of 305 mm and a thickness of 1.2 mm and a guide groove on one side was prepared at an injection cylinder temperature of 300° C., a mold temperature of 70° C., at an injection pressure of 100 kg/cm$^2$ for an injection period of 1.2 sec.

In the same manner as in Example 1, a metallic tellurium-carbon system film was formed on the substrate to obtain an optical recording medium.

The characteristics of the optical recording medium are shown in Table 1.

TABLE 1

Characteristics of optical recording medium

| Sample Items | Substrate Retardation (nm) at 830 nm (Double path) | Saturated moisture absorption 30° C., 80% RH × 250 hr (%) | Glass transition temp. (°C.) | Optical recording medium C/N ratio Normal state | Heat treatment 100° C. 1 hr | Readable diameter (mm) |
|---|---|---|---|---|---|---|
| Example 1 | 0.1–5.0 | 0.65 | 150 | 56 | 56 | 60–300 |
| Example 2 | 0.1–5.0 | 0.61 | 148 | 54 | 54 | 60–300 |
| Example 3 | 0.1–5.0 | 0.54 | 149 | 55 | 55 | 60–300 |
| Comp. Ex. 1 | 5–20 | 2.2 | 105 | 55 | Unmeasurable | 60–300 |
| Comp. Ex. 2 | 80–250 | 1.5 | 148 | 45 | 45 | 60–190 |

Example 4

On both surfaces of the cast-cured product of the epoxy resin composition of Example 1, 2 or 3, a SiO$_2$ film was formed in a thickness of 1,000 Å by a high frequency spattering method.

Subsequently, a metallic tellurium-carbon system film having a thickness of 4,000 Å was formed on one surface of the resulting transparent substrate by a spattering method.

Two sheets of the optical recording medium thus obtained were put on one another so that the functional films faced each other, and the peripheral portion thereof was fixed with an adhesive, to obtain a laminate type optical recording medium having a sandwitch structure.

The surface of the optical recording medium thus obtained had a pencil hardness of 4H because of the excellent performance of the SiO$_2$ film.

On the other hand, the surface of a laminate type optical recording medium prepared in the same manner as in Example 3, except that the SiO$_2$ film was not used had a pencil hardness of H which is rather low, tended to be sensitive to scratching or abrasion, and therefore, a sufficient care was required in handling.

Example 5

The same procedure as in Example 4 was repeated, except that SiO was substituted for the SiO$_2$ to obtain an optical recording medium. The surface of the optical recording medium had a pencil hardness of 4H and was excellent in resistance to abrasion or scratching.

Example 6

A casting mold having a diameter of 305 mm and a thickness of 1.2 mm was prepared using two sheets of glass plate which had been subjected to releasing treatment, and the epoxy resin composition of Example 1, 2 or 3 was poured into the mold and cured to obtain a cured product having a flat surface.

The cured product was coated with a radiation-curable resin having the following recipe uniformly by a dipping method:

| Recipe | Parts by weight |
|---|---|
| Dipentaerythritol hexaacrylate | 100 |
| 4'-Isopropyl-2-hydroxy-2-methyl-propiophenone | 4 |
| Isopropyl alcohol | 400 |
| Toluene | 100 |
| A leveling agent | 0.4 |

The coated surface was dried at 70° C. for 10 min and then irradiated with ultraviolet rays from a high pressure mercury lamp to form a coating film having a thickness of $5\mu$.

The surface of the transparent substrate thus obtained had a pencil hardness of 6H or more and was excellent in resistance to abrasion or scratching. That is, even after the surface was rubbed 100 times with steel wool, no scratch was found on the surface of the substrate.

In the same manner as in Example 1, a metallic tellurium-carbon system film was formed in a thickness of 300 Å on the above substrate to obtain an optical recording medium.

The surface of the medium having no information-recording layer was excellent in resistance to abrasion or scratching.

Example 7

Both surfaces of the transparent substrate consisting of the cast-cured product of the epoxy resin composition obtained in Example 6 were uniformly coated with a melamine resin solution comprising hexamethylolmelamine as the main component by means of a rollcoater, and the coated surfaces were dried and then cured at 140° C. for 2 hours, to form a cured coating film having a thickness of $10\mu$ on both surfaces.

The surface of the transparent substrate thus obtained had a pencil hardness of 5H or more, and even after the surface was rubbed 100 times with steel wool no scratches were found at all.

In the same manner as in Example 1, a metallic tellurium-carbon system film was formed in a thickness of 300 Å on the transparent substrate to prepare an optical recording medium.

The surface opposite to the information recording layer of the optical recording medium thus obtained had a pencil hardness of 4H, and was excellent in thermal resistance and resistance to abrasion or scratching.

The adhesion between the substrate and a metallic tellurium-carbon system film required for preparing an optical recording medium was very good.

Example 8

To both surfaces of the substrate having formed thereon a cured coating film obtained in Example 6 was applied $SiO_2$ by a high frequency spattering method to form a film having a thickness of 500 Å.

Subsequently, a metallic tellurium-carbon system film having a thickness of 4,000 Å was formed thereon in the same manner as in Example 1 to obtain an optical recording medium.

The surface opposit to the information-recording layer of the optical recording medium thus obtained had a pencil hardness of 4H and was excellent in thermal resistance and resistance to abrasion or scratching.

What is claimed is:

1. An optical recording medium comprising a transparent substrate of a synthetic resin and an information recording layer provided thereon, on which medium information can be optically written, read and erased by means of a laser light, said transparent substrate consisting essentially of a cast-cured product of an epoxy resin composition comprising an alicyclic epoxy resin, an organic polybasic acid anhydride, a curing-accelerator and an anti-discoloring agent.

2. An optical recording medium according to claim 1, wherein the transparent substrate has a SiO or $SiO_2$ film bonded to one side or both sides and the information recording layer is bonded to the SiO or $SiO_2$ film.

3. An optical recording medium according to claim 1, wherein the transparent substrate has a coating film of a radiation-curable resin, a thermosetting resin or a mixture thereof bonded to one side or both sides and the information-recording layer is bonded to the coating film.

4. An optical recording medium according to claim 1, wherein the transparent substrate has a coating film of a radiation-curable resin or a thermosetting resin bonded to one side or both sides and a SiO or $SiO_2$ film is further bonded to said coating film, and the information-recording layer is attached to the SiO or $SiO_2$ film.

5. An optical recording medium comprising a transparent substrate of a synthetic resin and an information-recording layer provided thereon, on which medium information can be optically written, read and erased by means of a laser light, said transparent substrate consisting essentially of a cast-cured product of an epoxy resin composition comprising a mixture of a major amount of an alicyclic epoxy resin and a minor amount of an aromatic epoxy resin, an organic polybasic acid anhydride, a curing accelerator and an anti-discoloring agent.

6. An optical recording medium according to claim 5, wherein the transparent substrate has a SiO or $SiO_2$ film bonded to one side or both sides and the information-recording layer is bonded to the SiO or $SiO_2$ film.

7. An optical recording medium according to claim 5, wherein the transparent substrate has a coating film of a radiation-curable resin, a thermosetting resin or a mixture thereof bonded to one side or both sides and the information-recording layer is bonded to the coating film.

8. An optical recording medium according to claim 5, 6 or 7 wherein the cast-cured product has an index of refraction of 1.50 to 1.60.

9. An optical recording medium according to claim 5, wherein the transparent substrate has a coating film of a radiation-curable resin or a thermosetting resin bonded to one side or both sides and a SiO or $SiO_2$ film is further bonded to said coating film, and the information-recording layer is attached to the SiO or SiO$_2$ film.

10. An optical recording medium according to claim 3, 7, 4 or 9, wherein the coating film of a radiation-curable resin has a pencil hardness of 4H or more.

11. An optical recording medium according to claim 2, 7, 4 or 9, wherein the radiation-curable resin is an ultraviolet ray-curable resin.

12. An optical recording medium according to claim 3, 7, 4 or 9, wherein the transparent substrate has a coating film of a radiation-curable resin, a thermosetting resin or a mixture thereof on both sides and the coating films are of the same kind of resin.

13. An optical recording medium according to claim 3, 7, 4 or 9, wherein the transparent substrate has a coating film of a radiation-curable resin, a thermosetting resin or a mixture thereof on both sides, and the coating films are of different kinds of resins.

14. An optical recording medium according to claim 3, 7, 4 or 9, wherein the transparent substrate has a coating film of a thermosetting resin on one side or both sides and the coating film is a hardened coating film of a melamine resin.

* * * * *